United States Patent
Nelson

(10) Patent No.: US 9,724,833 B1
(45) Date of Patent: Aug. 8, 2017

(54) SHAPE-ADAPTIVE MECHANISM FOR ROBOTIC GRASPING

(71) Applicant: The Board of Regents of the University of Nebraska, Lincoln, NE (US)

(72) Inventor: Carl A. Nelson, Lincoln, NE (US)

(73) Assignee: NUTECH VENTURES, Lincoln, NE (US)

( * ) Notice: Subject to any disclaimer, the term of this patent is extended or adjusted under 35 U.S.C. 154(b) by 0 days.

(21) Appl. No.: 15/155,546

(22) Filed: May 16, 2016

Related U.S. Application Data

(60) Provisional application No. 62/162,262, filed on May 15, 2015.

(51) Int. Cl.
  *B25J 15/08* (2006.01)
  *B25J 15/12* (2006.01)
  *B25J 15/00* (2006.01)

(52) U.S. Cl.
  CPC ............ *B25J 15/12* (2013.01); *B25J 15/0028* (2013.01)

(58) Field of Classification Search
  CPC ...... B25J 15/12; B25J 15/022; B25J 15/0266; B25J 15/0273
  USPC .......... 294/99.1, 106, 86.4, 103.1, 198, 902, 294/197; 269/266, 270, 286; 901/31, 39
  See application file for complete search history.

(56) References Cited

U.S. PATENT DOCUMENTS

| | | | | |
|---|---|---|---|---|
| 2,933,198 A | * | 4/1960 | Firestone | A61B 6/102 187/250 |
| 3,623,617 A | * | 11/1971 | Nemessanyi | B60P 1/34 414/495 |
| 3,885,692 A | * | 5/1975 | Anderson, Jr. | B66F 9/195 414/607 |
| 4,106,353 A | * | 8/1978 | Kondo | E05F 11/445 49/227 |
| 4,530,536 A | * | 7/1985 | Williams | B66C 1/64 294/118 |
| 4,744,595 A | * | 5/1988 | Tonning | B66C 1/0243 294/65 |

(Continued)

FOREIGN PATENT DOCUMENTS

WO 9853961 12/1998

OTHER PUBLICATIONS

Xiong, C., Ding, H., Xiong, Y.: Fundamentals of Robotic Grasping and Fixturing. World Scientific (Oct. 2007).

(Continued)

*Primary Examiner* — Paul T Chin
(74) *Attorney, Agent, or Firm* — Advent, LLP

(57) ABSTRACT

A grasper can include a first pantograph cell and a second pantograph cell coupled with the first pantograph cell. The first and second pantograph cells can be coupled together at a first pivot and a second pivot. The grasper can also include a finger extendable in a direction extending between the first pivot and the second pivot. The grasper can include a support base, where one or more links of the first pantograph cell can be slidably coupled with the support base for extending the grasper. In some embodiments, the grasper can be configured to extend along a curved path. In some embodiments, the finger can be biased in a direction away from an object to be grasped by the grasper, and also biased in a direction toward an object to be grasped by the grasper when the grasper is extended.

18 Claims, 12 Drawing Sheets

(56) References Cited

U.S. PATENT DOCUMENTS

| | | | | |
|---|---|---|---|---|
| 4,933,531 A * | 6/1990 | Ichikawa | ............... | B23K 11/31 |
| | | | | 219/86.25 |
| 5,762,390 A | 6/1998 | Gosselin et al. | | |
| 5,941,678 A * | 8/1999 | Saito | ..................... | B61B 3/00 |
| | | | | 414/626 |
| 6,297,905 B1 * | 10/2001 | Takamoto | .............. | G03B 21/58 |
| | | | | 359/443 |
| 7,568,880 B2 * | 8/2009 | Horie | ........................ | B25J 7/00 |
| | | | | 294/86.4 |
| 7,614,673 B2 * | 11/2009 | Maitland | ................. | A61F 2/586 |
| | | | | 294/106 |
| 8,886,287 B2 | 11/2014 | Larson et al. | | |

OTHER PUBLICATIONS

Synthesis method for linkages with center of mass at invariant link point—Pantograph based Mechanisms | Oct. 20, 2011 | https://www.deepdyve.com/lp/elsevier/synthesis-method-for-linkages-with-center-of-mass-at-invariant-link-8nMgOlwmaK.

Birglen, L., Laliberté, T., Gosselin, C.: Underactuated Robotic Hands. Springer (Nov. 2010), Chapter 3.

You, Z., Chen, Y.: Motion Structures: Deployable Structural Assemblies of Mechanisms. Spon Press (Oct. 2011), Chapter 2 and Chapter 3.

Laliberte, Thierry, Birglen, Lionel, Gosselin, Clement M.: Underactuation in robotic grasping hands. Machine Intelligence & Robotic Control, vol. 4, No. 3, 1-11 (Sep. 2002).

Mabie, H. H., Reinholtz, C. F.: Mechanisms and Dynamics of Machinery, 4th ed. Wiley (Jan. 1987), Chapter 2.

Mabie, H. H., Reinholtz, C. F.: Mechanisms and Dynamics of Machinery, 4th ed. Wiley (Jan. 1987), Chapter 9.

* cited by examiner

US 9,724,833 B1

SHAPE-ADAPTIVE MECHANISM FOR ROBOTIC GRASPING

CROSS-REFERENCE TO RELATED APPLICATIONS

The present application claims the benefit under 35 U.S.C. §119(e) of U.S. Provisional Application Ser. No. 62/162,262, filed May 15, 2015, and titled "SHAPE-ADAPTIVE MECHANISM FOR ROBOTIC GRASPING," which is herein incorporated by reference in its entirety.

SUMMARY

A grasper can include a first pantograph cell and a second pantograph cell coupled with the first pantograph cell. The first and second pantograph cells can be coupled together at a first pivot and a second pivot. The grasper can also include a finger extendable in a direction extending between the first pivot and the second pivot. The grasper can include a support base, where one or more links of the first pantograph cell can be slidably coupled with the support base for extending the grasper. In some embodiments, the grasper can be configured to extend along a curved path. In some embodiments, the finger can be biased in a direction away from an object to be grasped by the grasper, and also biased in a direction toward an object to be grasped by the grasper when the grasper is extended.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DRAWINGS

The Detailed Description is described with reference to the accompanying figures. The use of the same reference numbers in different instances in the description and the figures may indicate similar or identical items.

DETAILED DESCRIPTION

Underactuated and adaptive robotic hands are known for their ability to achieve multiple contact points on arbitrarily shaped objects with relatively simple actuation, improving grasp stability. However, in some cases the sequence in which these contact points are initiated does not promote robust capture of the grasped object. The present disclosure describes an underactuated grasper based on a pantograph structure, such as an asymmetric pantograph. The grasper can achieve robust enveloping capture of arbitrarily shaped objects (including non-convex shapes) while maintaining balanced forces at multiple contact points. Systems, apparatus, and techniques described here can be adjustable for differently sized objects.

Figure 1:
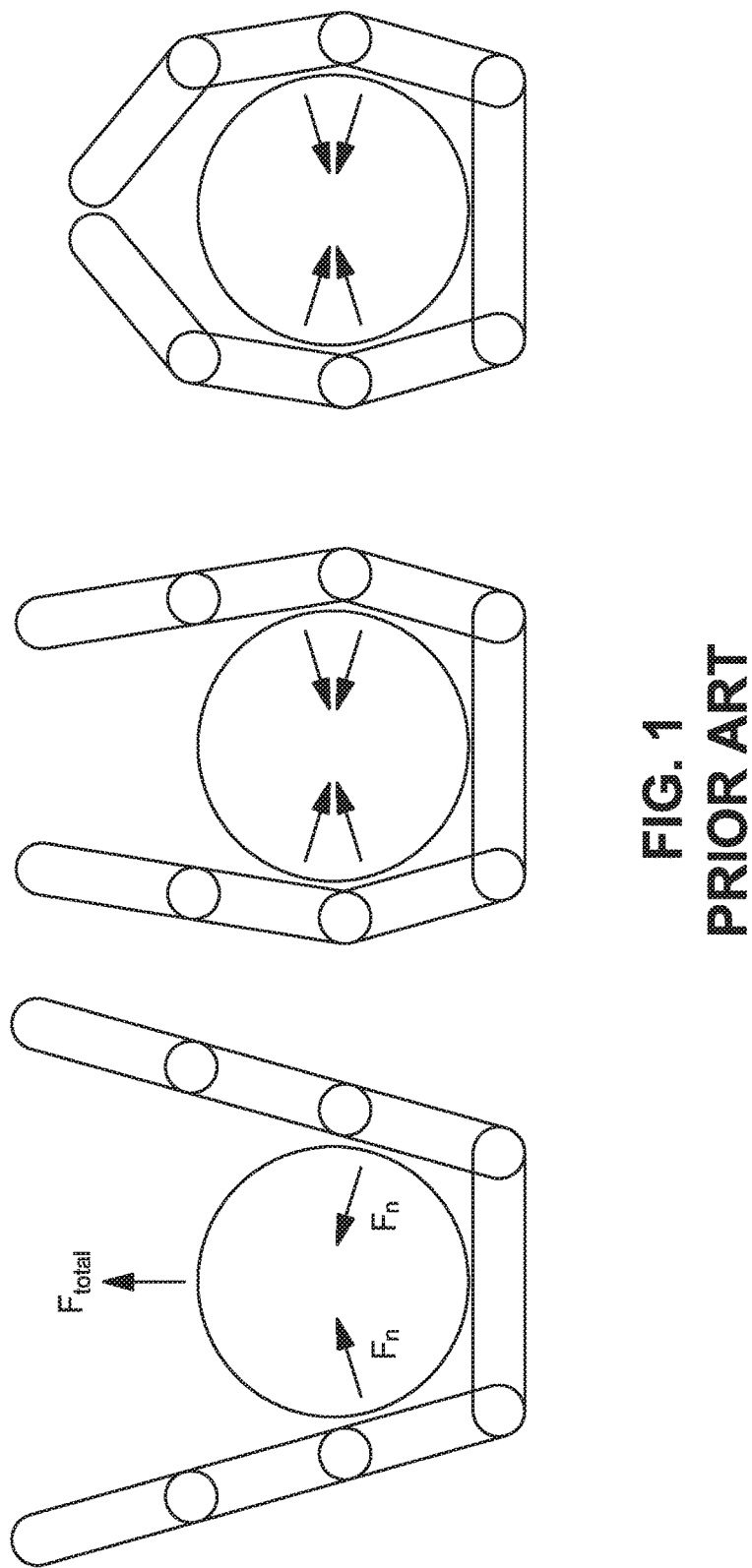
FIG. 1 is a diagrammatic illustration of an underactuated grasper.

In robotic grasping, one of the most important issues is that of stability of the grasp. Pinch-type grasps rely heavily on friction at the contact points, since they can involve as few as two contact points, and without a significant frictional effect this would not lead to stability under general loading conditions. Enveloping grasps can involve more contact points, but one of the challenges for arbitrarily shaped objects is maintaining some uniformity in the magnitudes of the contact forces to decrease sensitivity of the grasp to disturbances (and thereby increase robustness). Underactuated graspers are favored for their relative mechanical simplicity and their adaptability (e.g., without the need for feedback control). Underactuated graspers typically have a sequence in which contact is made. As illustrated in FIG. 1, initial contact may push the object away from the grasper before later contacts, which would otherwise stabilize the grasp, can be made. A grasper combining the benefits of underactuation (e.g., balanced multi-point contact) with a more robust approach to enveloping is described herein.

As described herein, a grasper can achieve a multi-point contact on a grasped object, and at least partially envelope the object prior to initial contact (to avoid pushing the object out of the grasp). To do this robustly, a mechanism is included which extends and encircles the grasped object and then closes inward on the object, or which extends/encircles and closes inward simultaneously. The apparatus, systems, and techniques described herein can use one or more pantograph mechanisms. In some embodiments, instead of extending in a rectilinear fashion, a pantograph-based device may extend along a curved path which eventually encloses the grasped object. For example, moving the pivot point of a scissor-like pantograph cell away from the links' midpoint can produce an arc-shaped extension (e.g., as described with reference to FIG. 2). This configuration can provide an enveloping behavior, and adjusting the distance of the pivot point from the center of each link can be used to tailor the grasper's enveloping radius to the object(s) being grasped.

Figure 3:
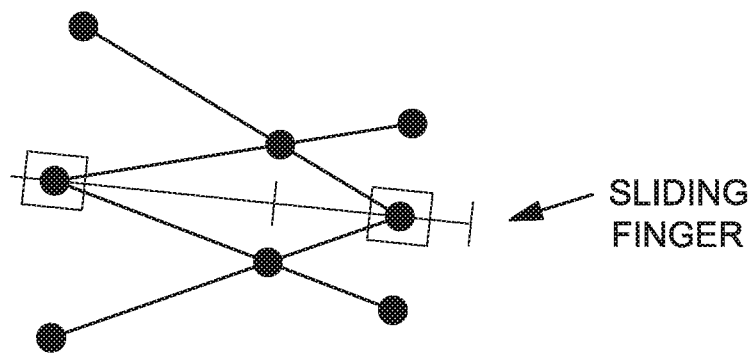
FIG. 3 is a diagrammatic illustration of a pantograph with a finger in accordance with an example embodiment of the present disclosure.

It is noted that as a pantograph extends along an arc, the line segment joining opposing pin joints of each scissor-like cell decreases in length, and can remain oriented radially inward (e.g., as described with reference to FIG. 3). By allowing a biased (e.g., spring-loaded) contacting element (hereinafter referred to as a finger) to slide along this line segment, extension of the pantograph can also drive the inward motion of the finger. Arrangement of fingers in each of the modified pantograph cells can produce a complete grasper, which simultaneously envelopes and collapses to produce multi-point contact.

Figure 4:
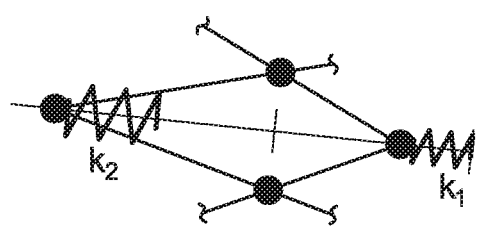
FIG. 4 is a diagrammatic illustration of a pantograph with a finger, an extension spring, and a compression spring in accordance with an example embodiment of the present disclosure.
Figure 5A:
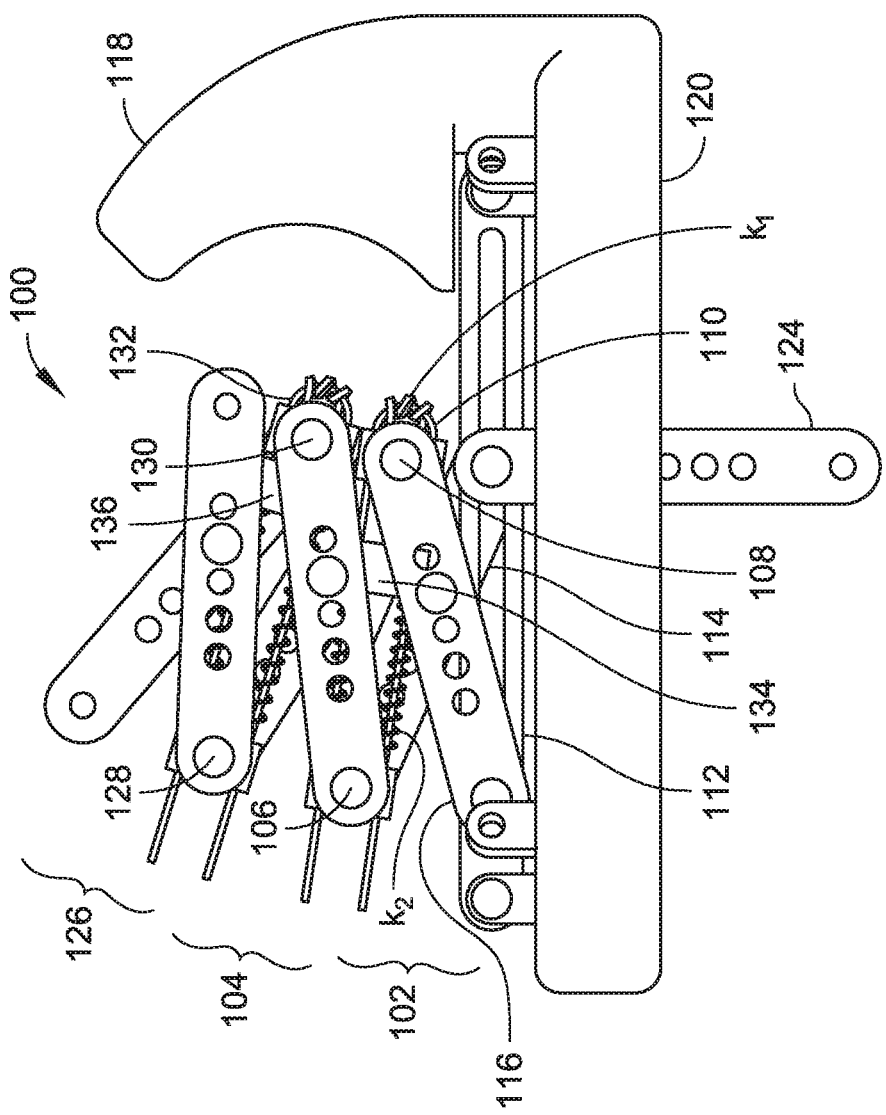
FIG. 5A is a side elevation view illustrating a grasper with pantograph cells having pivot locations at ratios of 0.65, 0.65, and 0.65 in accordance with an example embodiment of the present disclosure.
Figure 5B:
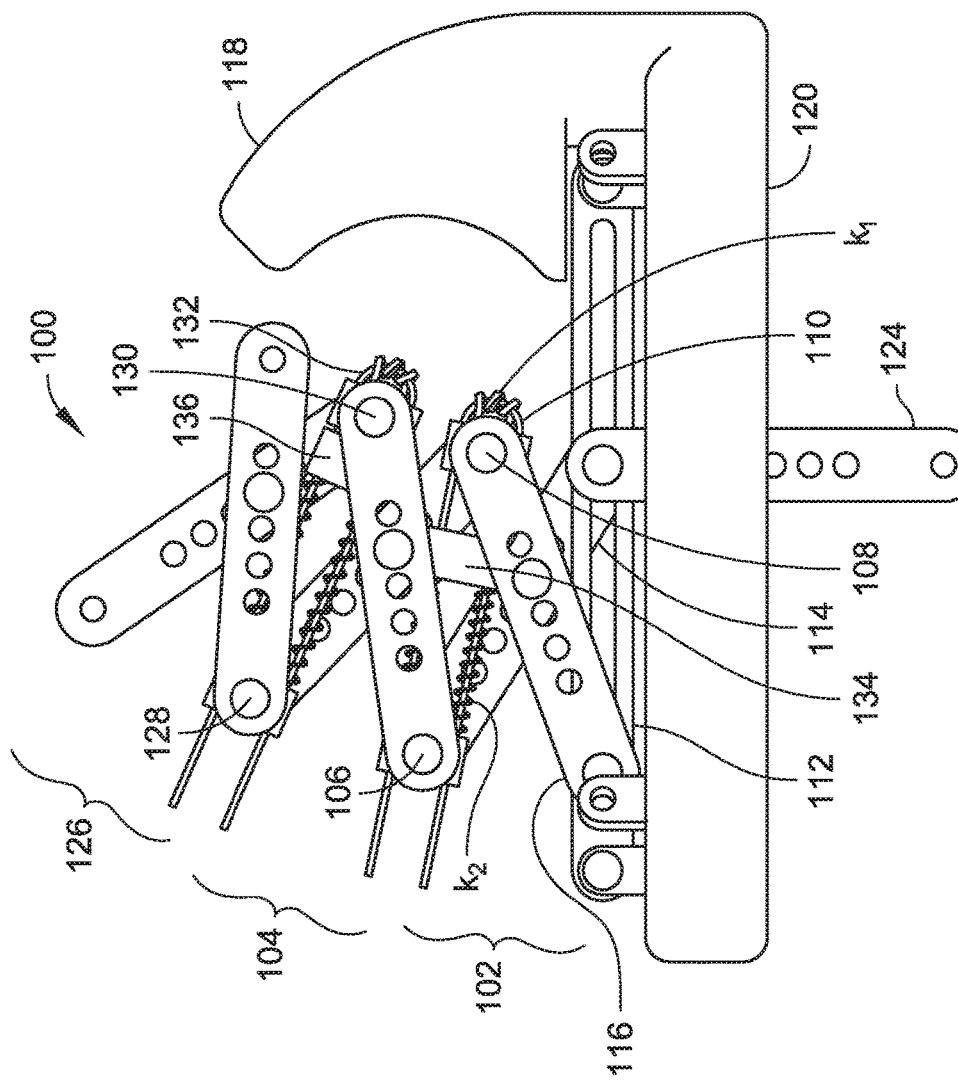
FIG. 5B is another side elevation view of the grasper illustrated in FIG. 5A, where the pantograph cells are shown in a partially extended orientation.
Figure 5C:
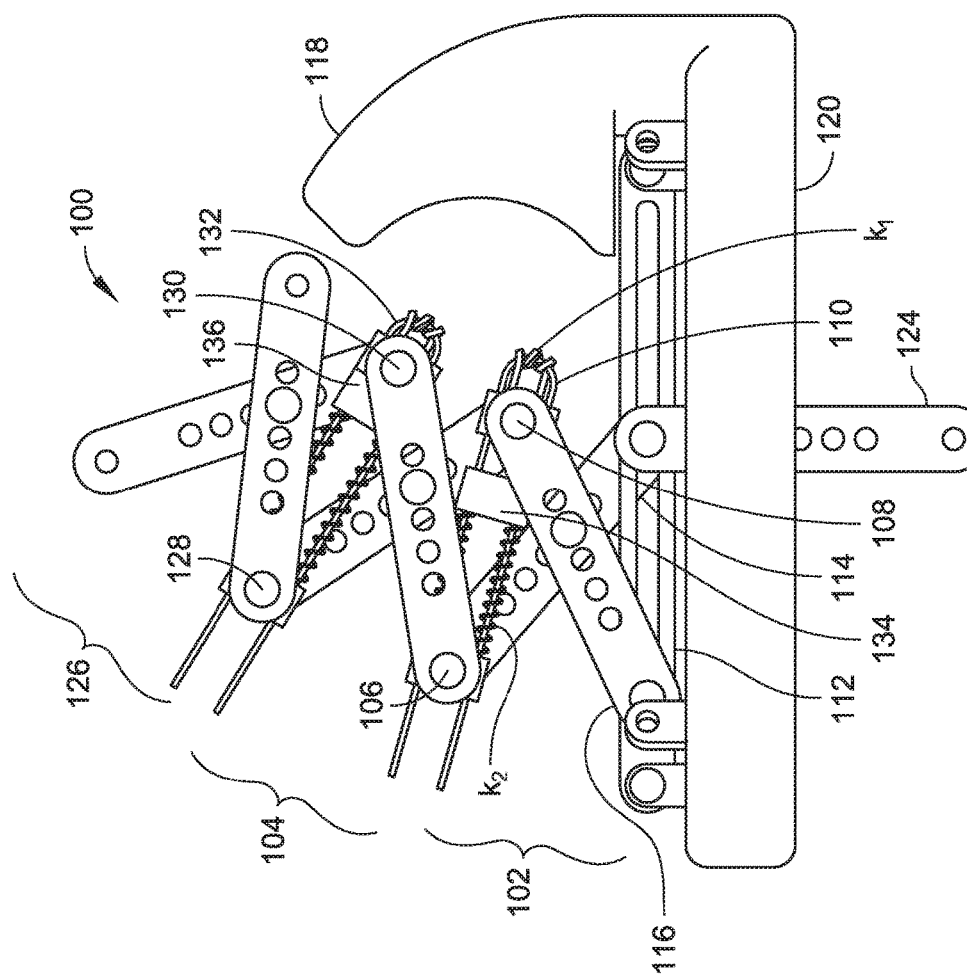
FIG. 5C is a further side elevation view of the grasper illustrated in FIG. 5A, where the pantograph cells are shown in a further extended orientation.
Figure 5D:
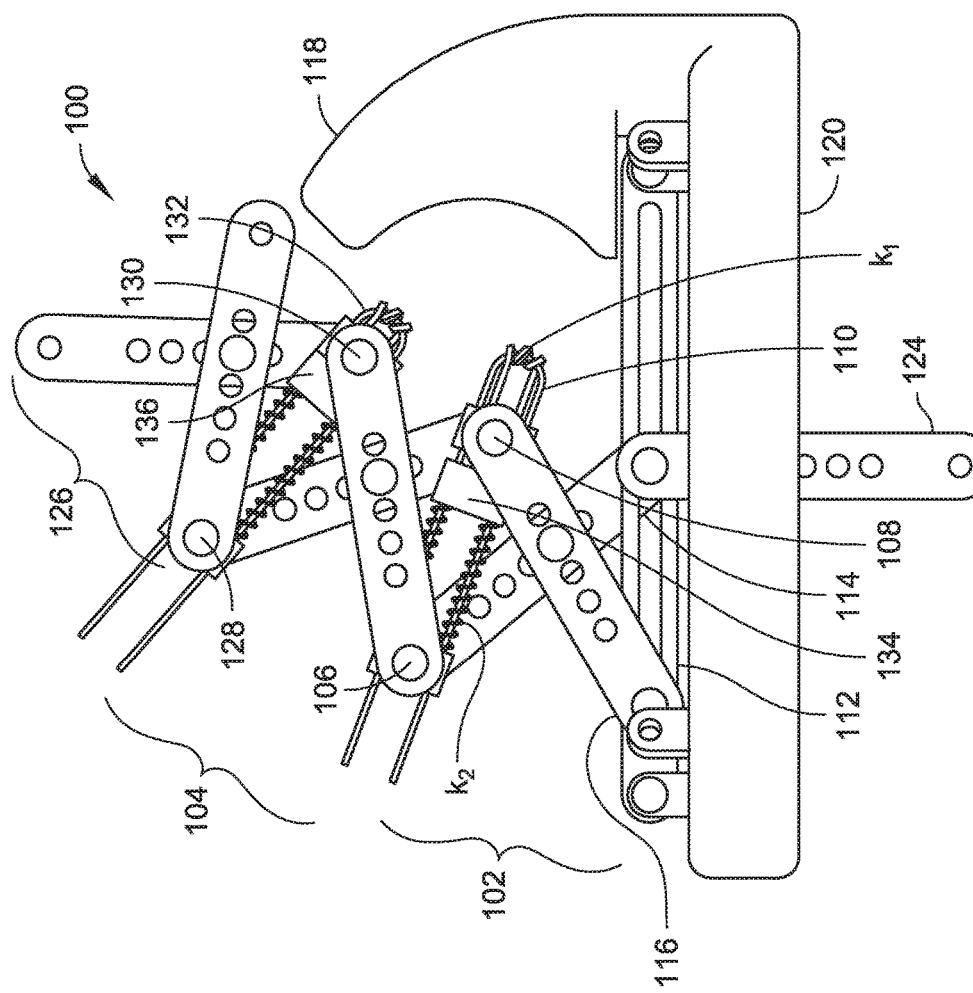
FIG. 5D is another side elevation view of the grasper illustrated in FIG. 5A, where the pantograph cells are shown in a still further extended orientation.
Figure 6:
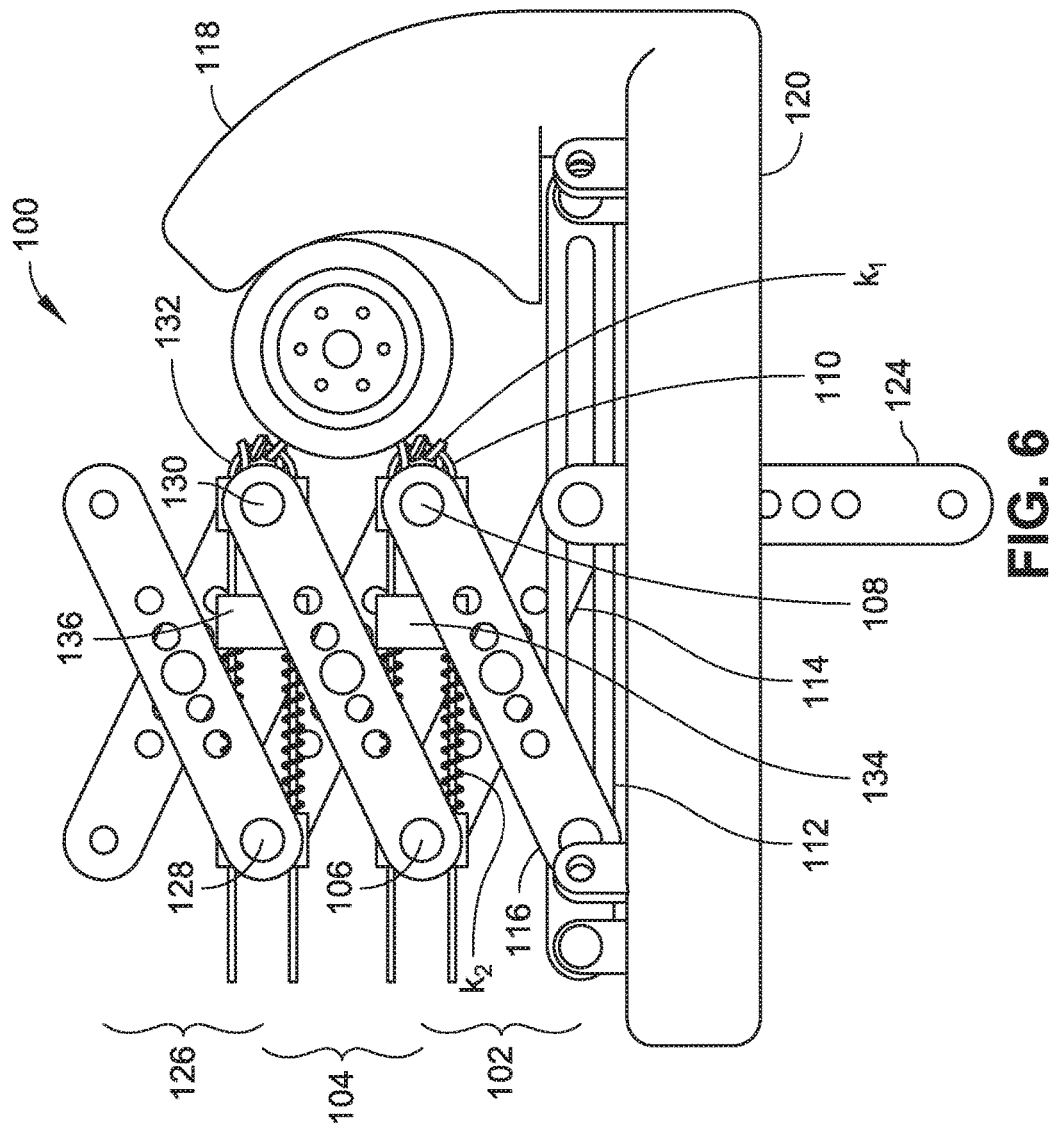
FIG. 6 is a side elevation view illustrating a grasper with pantograph cells having pivot locations at ratios of one (1), one (1), and one (1) in accordance with an example embodiment of the present disclosure.
Figure 7:
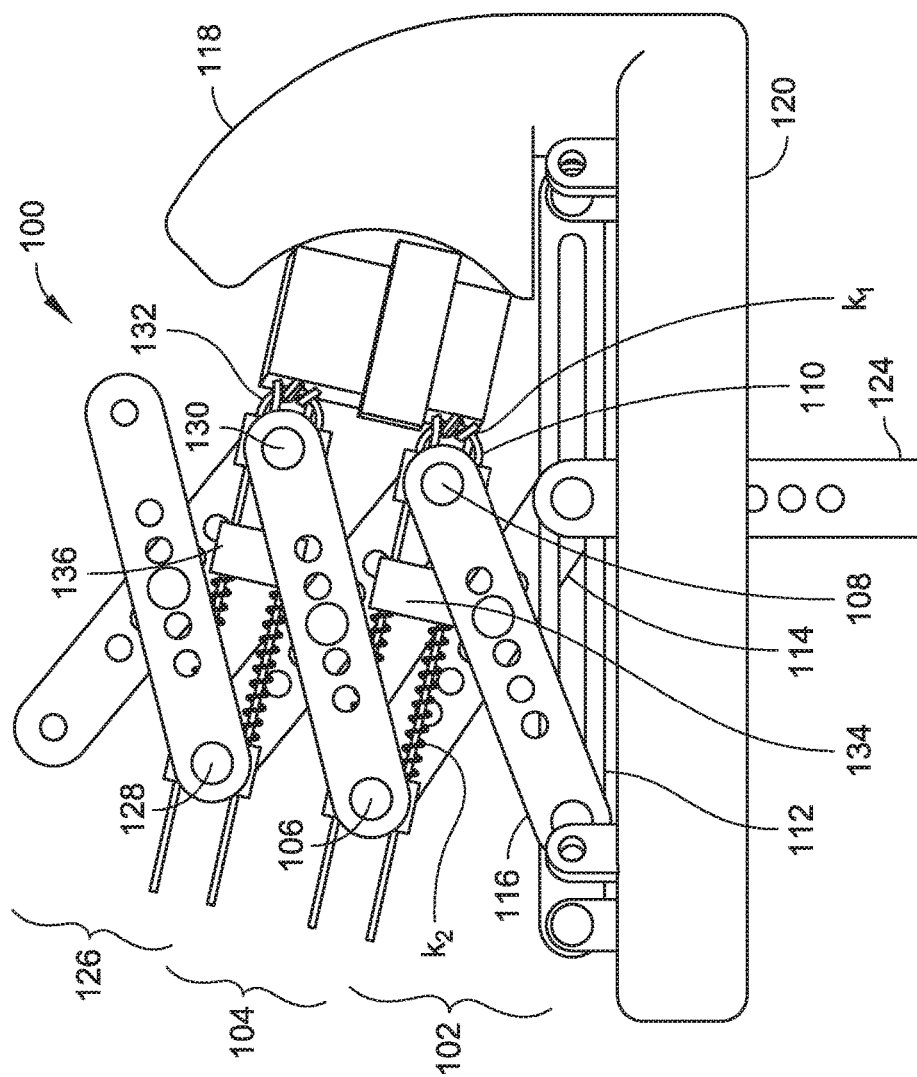
FIG. 7 is a side elevation view illustrating a grasper with pantograph cells having pivot locations at ratios of 0.65, one (1), and one (1) in accordance with an example embodiment of the present disclosure.
Figure 8:
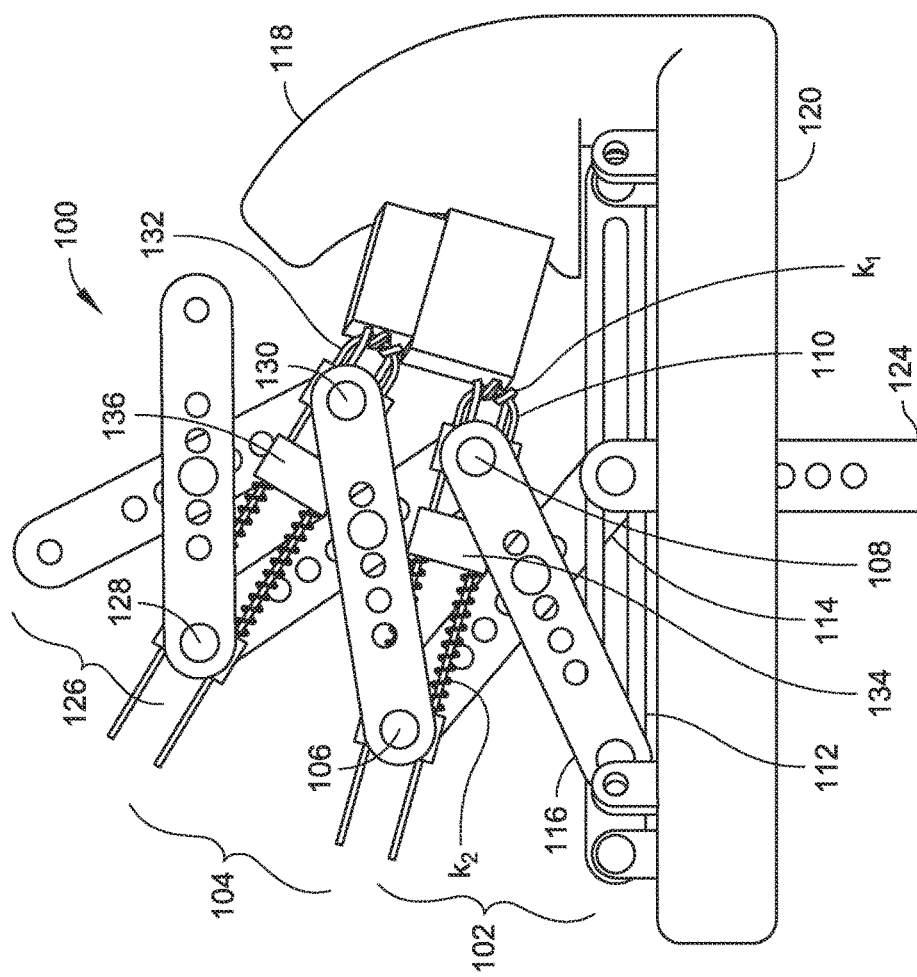
FIG. 8 is a side elevation view illustrating a grasper with pantograph cells having pivot locations at ratios of 0.65, 0.65, and one (1) in accordance with an example embodiment of the present disclosure.
Figure 9:
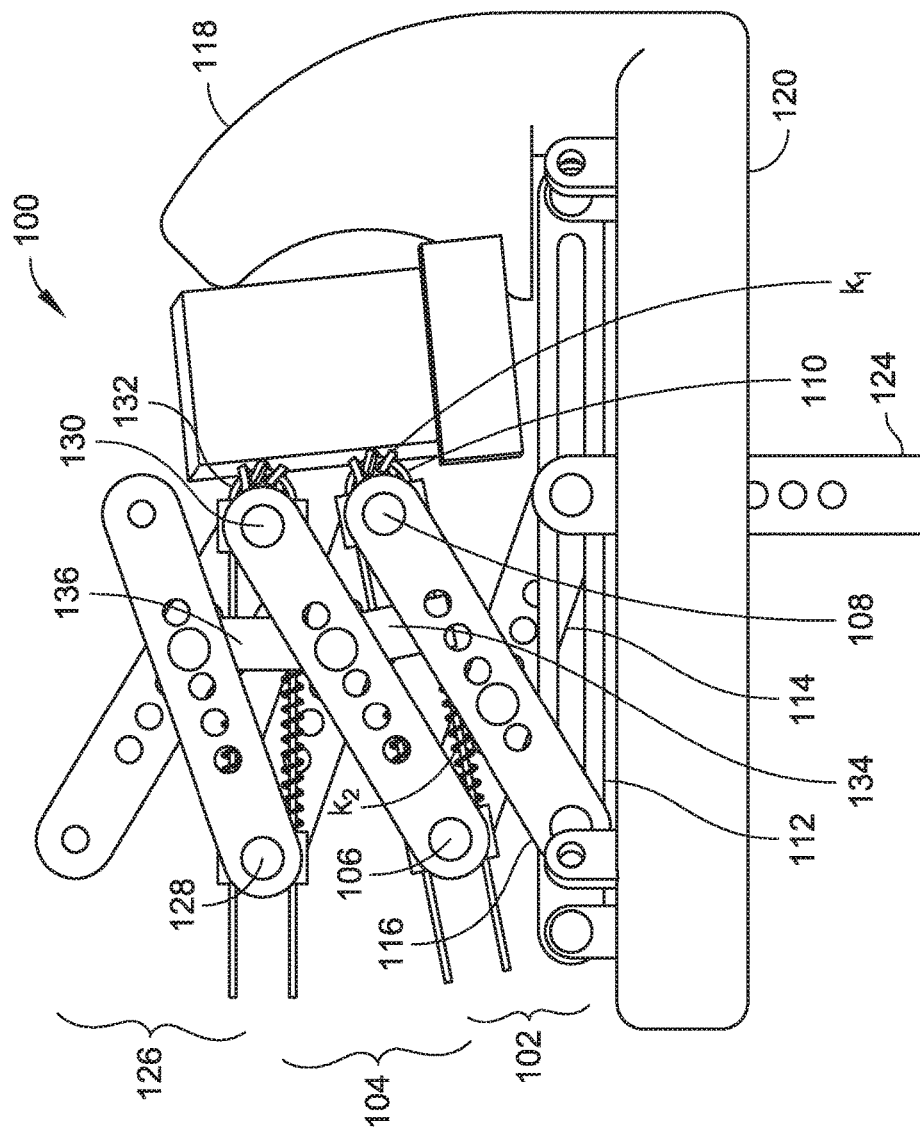
FIG. 9 is a side elevation view illustrating a grasper with pantograph cells having pivot locations at ratios of 1.55, 0.65, and 0.65 in accordance with an example embodiment of the present disclosure.

To ensure that contact forces remain well balanced for different sizes and shapes of grasped objects, the fingers can be adjustably spring loaded (e.g., as described with reference to FIG. 4). For example, one or more fingers can be configured using a metamorphic linkage. During initial extension of the pantograph, only the return spring $k_1$ (e.g., with a relatively small spring constant) may be active, keeping the fingers retracted. At some point in the extension, a stop can be engaged with (e.g., activate) the second, stiffer spring $k_2$, whose function is to deploy the finger. Adjustment for different object sizes can be made by changing the position of the stop on the finger, thus changing both the amount of enveloping which occurs prior to finger deployment and the overall finger extension (e.g., related to the diameter of the grasped object). Because the engagement of each finger deployment spring can be based on the position of the stop (e.g., and not on the contacts of the other fingers), the contact forces can remain generally balanced, and can be further tailored by adjusting the stops on the fingers non-uniformly if desired. In this manner, selection of the biasing mechanisms for a finger and adjustment of a stop fixedly attached to the finger can be used to "tune" the force balance on a finger.

Figure 2:
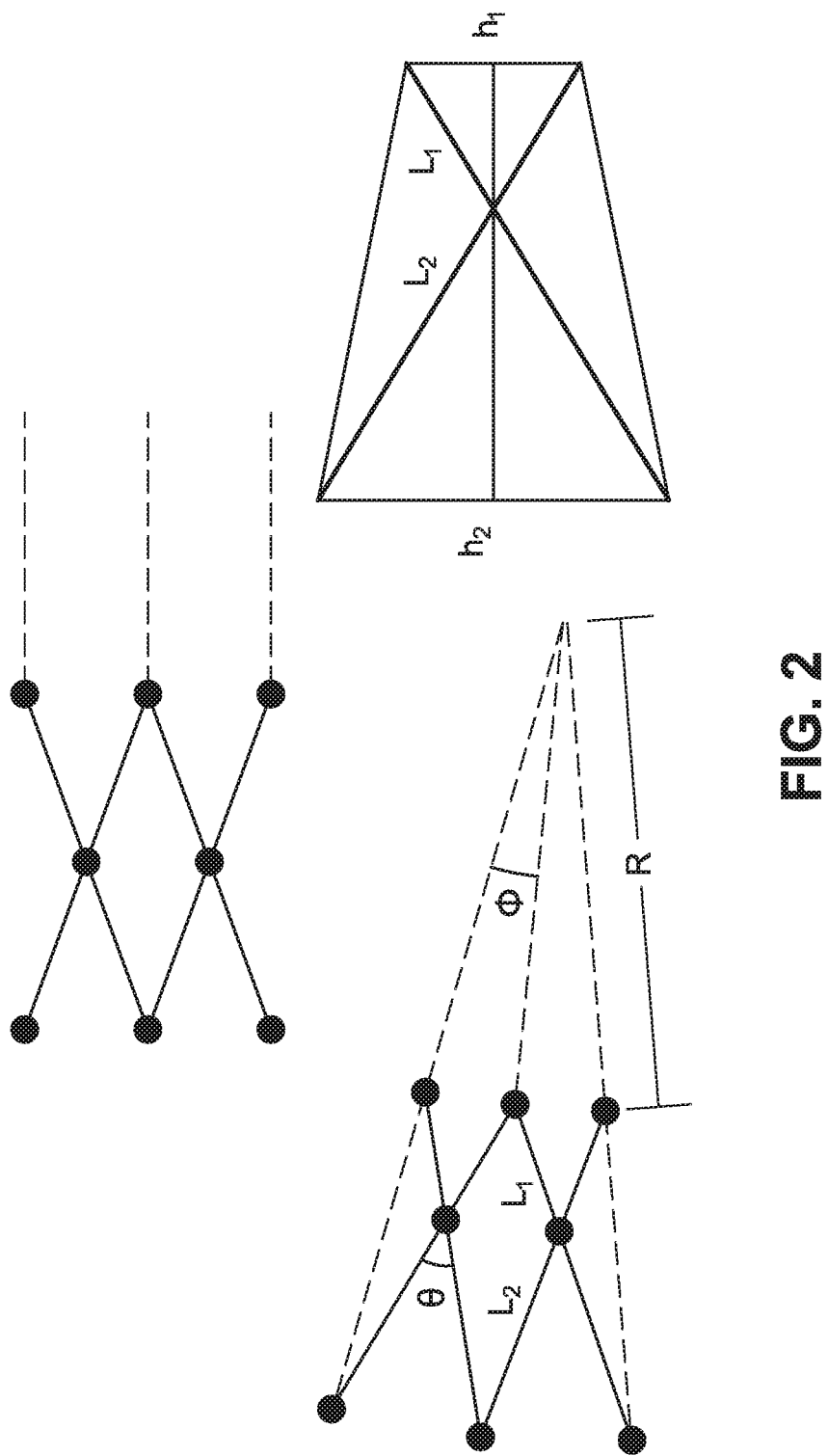
FIG. 2 is a diagrammatic illustration of pantographs in accordance with example embodiments of the present disclosure.

As shown in the trapezoid-shaped construction of FIG. 2, and using the notation indicated therein, the modified pantograph results in similar triangles such that $$\sin(\theta/2) = h_1/2L_1 = h_2/2L_2 \qquad (1)$$

It can also be seen that the radius of curvature of the enclosed (grasped) space is given by $$r_1 = h_1/[2\sin(\phi/2)] = L_1 \sin(\theta/2)/\sin(\phi/2) \qquad (2)$$

Still using the construction of FIG. 2, the relation between the pantograph input angle $\theta$ and the single-cell inclination angle $\phi$ is $$\tan(\phi/2) = (\Delta L/L)\tan(\theta/2) \qquad (3)$$

where $\Delta L$ is defined as $L_2 - L_1$, and L is defined as $L_1 + L_2$. Therefore, with an n-cell symmetric arrangement (two identical gripper halves each with n modified pantograph cells), a closure limit is reached when the total horizontal travel of the distal cell is equal to half the initial spacing of the two gripper sides, or $$d = 2h_1[\cos(\phi) + \cos(2\phi) + \ldots + \cos(n\phi)] \qquad (4)$$

where d is the initial separation between gripper halves (or the palm width).

Although identities exist to evaluate $\cos(\tan^{-1}(\phi))$ and so forth for combining Equations (3) and (4), the sum in Equation (4) may make a closed-form expression in $\theta$ cumbersome; thus, a computational approach to solve for the limiting value of $\theta_{max}$ can be used for a given grasper configuration. This may influence the parameter values used in setting up a grasper of this type for handling objects in different size ranges.

Finally, as the input to the pantograph mechanism may be more likely to be a slider displacement than an angular motion in $\theta$, it is noted that an ideal fully collapsed cell may have a width L, and that the slider displacement relation, measured from this fully collapsed position, may be that of a slider-crank:

$$x_{input} \approx L_1(1-\cos\theta) + L_1^2 \sin^2\theta/2L_2 \qquad (5)$$

Equation (5) likewise may be well suited to a computational rather than a closed-form solution. Therefore, a procedure may be to use Equations (2) and (3) together to find a desirable combination of $L_1$ and $L_2$ which produces a value of $r_1$ that is well matched to the object being grasped, and then select the initial spacing d according to Equation (4). Equation (5) can be used if precise control of the closure is required.

Now, as concerning contact forces $F_c$ (axially along each finger), with the return spring ($k_1$) and the finger deployment spring ($k_2$) chosen such that $k_2 \gg k_1$, $$F_c = k_2[x_f + L(1-\cos\theta) - y] - k_1 x_f \qquad (6)$$

$$y = L - k_{2free} - x_s \qquad (7)$$

where $x_f$ is the finger displacement measured from the inner pin joint, y is the amount of finger displacement which occurs prior to contact with the finger deployment spring (with free length $k_{2free}$), and $x_s$ is the stop position measured from the inner pin joint. The actual values of $F_c$ and $x_f$ may vary for different grasped objects depending on the object shape and the equilibrium of forces achieved, and the constraint that $x_f \leq x_s$ (see, for example, FIG. 4).

Referring now to FIGS. 5 through 9, a grasper 100 with pantograph components may include multiple pivot locations (e.g., $L_1/L_2 = \{0.4, 0.65, 1, 1.55, 2.5\}$) so that the angular dependency described in Equation (3) can be adjusted. Elastic bands serve as the finger return springs $k_1$, and each wire finger includes an adjustable stop (e.g., as previously mentioned).

To test such a grasper, several objects may be used, each with a different shape and size, as shown in FIGS. 6 through 9. The grasp for each object may be customized using different pivot point settings (e.g., different enveloping curvatures) as appropriate to achieve the grasp. Some possible grasp configurations are summarized in Table 1, with the cases from FIGS. 5A though 9 indicated. In general, a number of possible grasper configurations is $m^n$, where m is the number of pivot adjustments and n is the number of pantograph cells.

TABLE 1

| Configuration | $L_1/L_2$ (cell 1) | $L_1/L_2$ (cell 2) | $L_1/L_2$ (cell 3) | FIG. |
|---|---|---|---|---|
| 1 | Low | Low | Low | 5A-5D |
| 2 | Low | Low | Medium | 8 |
| 3 | Low | Low | High | — |
| 4 | Low | Medium | Low | — |
| 5 | Low | Medium | Medium | 7 |
| 6 | Low | Medium | High | — |
| 7 | Low | High | Low | — |
| 8 | Low | High | Medium | — |
| 9 | Low | High | High | — |
| 10 | Medium | Low | Low | — |
| 11 | Medium | Low | Medium | — |
| 12 | Medium | Low | High | — |

TABLE 1-continued

| Configuration | $L_1/L_2$ (cell 1) | $L_1/L_2$ (cell 2) | $L_1/L_2$ (cell 3) | FIG. |
|---|---|---|---|---|
| 13 | Medium | Medium | Low | — |
| 14 | Medium | Medium | Medium | 6 |
| 15 | Medium | Medium | High | — |
| e | Medium | High | Low | — |
| 17 | Medium | High | Medium | — |
| 18 | Medium | High | High | — |
| 19 | High | Low | Low | 9 |
| 20 | High | Low | Medium | — |
| 21 | High | Low | High | — |
| 22 | High | Medium | Low | — |
| 23 | High | Medium | Medium | — |
| 24 | High | Medium | High | — |
| 25 | High | High | Low | — |
| 26 | High | High | Medium | — |
| 27 | High | High | High | — |

As described herein, adaptive graspers can provide stable, multi-contact grasping based on a pantograph mechanism. These graspers can achieve stability by partially enveloping the grasped object prior to radially collapsing inward to engage the contact points. An underactuated robotic grasper based on a pantograph design can envelop a grasped object and has several independent contact points so it can grasp objects of various sizes and shapes. Forces exerted by the grasping points can also be distributed on various sides of the object, which can ensure stability. The graspers described herein can grasp objects of varying and/or irregular geometries. Further, in some embodiments, more contact points can provide less force on an object, minimizing potential damage to the object.

In some embodiments, graspers as described herein can be used with robots that may handle various objects around the home, and/or with pole graspers (e.g., for disabled and/or elderly individuals). In some embodiments, the graspers can be used with assembly line steps that may require low force and/or versatile grasping. For example, graspers can be used in applications including, but not necessarily limited to: quality assurance (e.g., to remove defective pieces); packaging objects; loading, unloading, and/or sorting objects, and so forth. In some embodiments, robots employing such graspers can also be used in the field to collect various objects, e.g., for collecting debris after weather events, for geological and/or planetary rock sampling operations, for military improvised explosive device (IED)/suspicious object handling applications, for fruit picking robot applications, and so forth. However, these implementations are provided by way of example and are not meant to limit the present disclosure. In other embodiments, graspers can be used in other applications.

An example grasper 100 can include a first pantograph cell 102 and a second pantograph cell 104 coupled with the first pantograph cell 102. The first and second pantograph cells 102 and 104 can be coupled together at a first pivot 106 and a second pivot 108. The grasper 100 can also include a finger 110 extendable in a direction extending between the first pivot 106 and the second pivot 108. In some embodiments, the grasper 100 can also include a support base 112, and at least a first link 114 of the first pantograph cell 102 can be slidably coupled with the support base 112 for extending the grasper 100. In some embodiments, a second link 116 of the first pantograph cell 102 may also be slidably coupled with the support base 112 for extending the grasper 100. However, in other embodiments, the second link 116 can be fixedly attached to the support base 112 (e.g., while still able to rotate).

Figure 10:
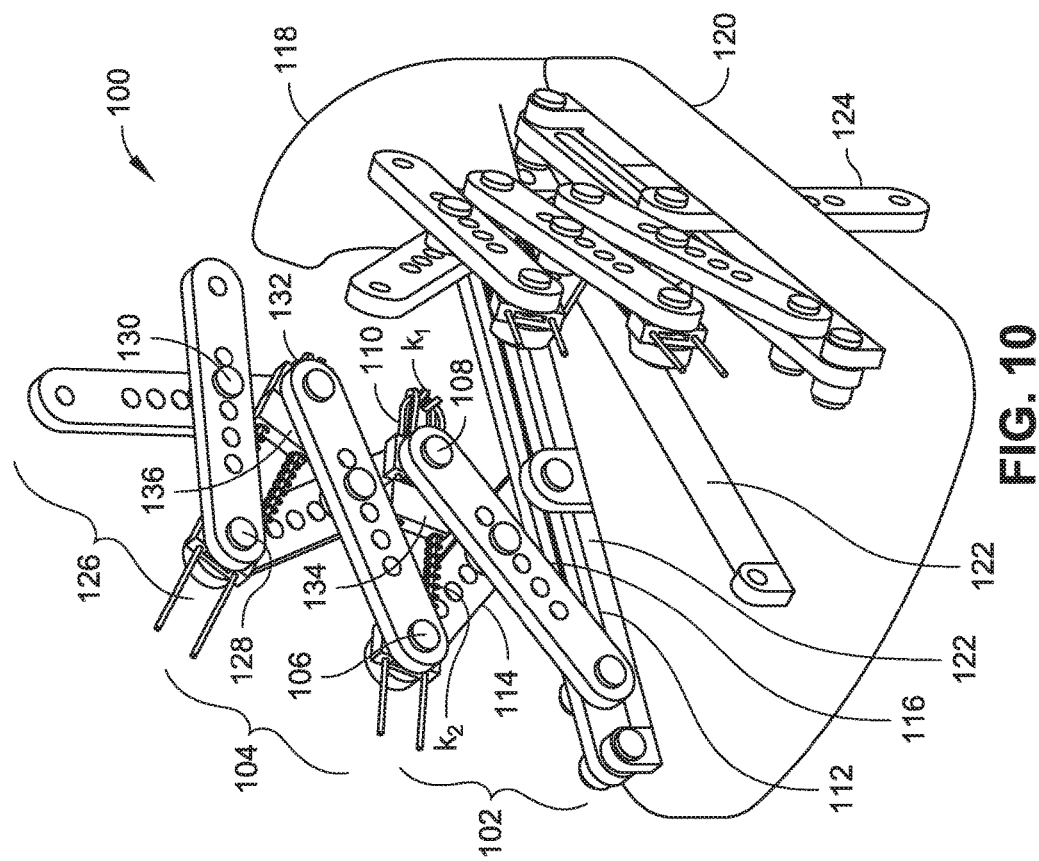
FIG. 10 is an isometric view illustrating a grasper with pantograph cells in different planes in accordance with an example embodiment of the present disclosure.

In some embodiments, the first link 114 and/or the second link 116 can translate with respect to the support base 112 using a pin and slot configuration. In other embodiments, the first link 114 and/or the second link 116 can translate with respect to the support base 112 using a ball slotted into, e.g., an annulus, in a support base 112. For example, multiple sections of pantograph cells can be connected to a base (e.g., at angles of about one hundred and twenty degrees (120° from one another). The pantographs can use rotational joints, universal joints, and so on. However, these configurations are provided by way of example and are not meant to limit the present disclosure. In other embodiments, different numbers of pantograph sections can be used (e.g., four), can be oriented from one another at different angles, and so forth (e.g., as described with reference to FIG. 10). For example, the plane of actuation of each pantograph can be adjustable.

In some embodiments, indexing pins, sets screws, and the like may be used with guide tracks for adjusting an angular orientation of a pantograph. In some embodiments, two pantographs can be positioned directly across from one another (e.g., in a common plane) to grasp objects between fingers on either side. In other embodiments, a pantograph can be positioned across from another member, such as a grounded member 118 fixedly attached to a mounting base 120. Further, the mounting base 120 can include one or more slots 122 for receiving an actuator 124 for driving the first link 114. The actuator 124 can be connected to an actuation device (e.g., a linear actuator, a rack and gear actuator, a cable pulley on a spool, etc.). In some embodiments, multiple pantographs can be actuated by a common device. For example, the actuator for each pantograph may be coupled with a separate cable, and the cables may then be routed to a common motor (e.g., through a loop included with a mounting base). In this manner, the multiple pantographs can be actuated together.

In some embodiments, a grasper 100 can include more than two pantograph cells (e.g., arranged in a chain). For example, a grasper 100 can include a third pantograph cell 126 coupled with the second pantograph cell 104 at a third pivot 128 and a fourth pivot 130, with a second finger 132 extendable in a second direction extending between the third pivot 128 and the fourth pivot 130. Further, one or more pantograph cells in a chain can be formed using links, which can at least partially define one or more of the pivot points (e.g., the first pivot, the second pivot, etc.). In some embodiments, a link can define one or more discrete positions for a pivot (e.g., for the first pivot 106, the second pivot 108, etc.). In some embodiments, a link can define a continuously adjustable path for a pivot (e.g., for the first pivot 106, the second pivot 108, etc.). For example, links can include separate holes, slots, etc. Further, links that form a pantograph cell can be coupled together at an intermediate pivot, and the links can also define one or more discrete positions for the intermediate pivot, a continuously adjustable path for the intermediate pivot, and so forth. Adjustment of the intermediate pivot point can change the ratio of L1/L2 (e.g., as previously described). As described, adjustment for different object sizes can be made by changing the position of stops 134 and 136 fixedly connected to fingers 110 and 132.

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:

1. A grasper comprising:
    a first pantograph cell;
    a second pantograph cell coupled with the first pantograph cell at a first pivot and a second pivot;
    a finger extendable in a direction extending between the first pivot and the second pivot; and
    a support base, wherein at least a first link of the first pantograph cell is slidably coupled with the support base for extending the grasper, wherein the finger is biased in a direction toward an object to be grasped by the grasper when the grasper is extended.

2. The grasper as recited in claim 1, wherein the grasper is configured to extend along a curved path.

3. The grasper as recited in claim 1, wherein the finger is biased in a direction away from an object to be grasped by the grasper.

4. The grasper as recited in claim 3, wherein the finger is spring-biased by a tension spring.

5. The grasper as recited in claim 1, wherein the finger is spring-biased by a compression spring.

6. The grasper as recited in claim 1, further comprising a stop connected to the biased finger for being biased toward the object to be grasped by the grasper when the grasper is extended.

7. A grasper comprising:
    a first pantograph cell;
    a second pantograph cell coupled with the first pantograph cell at a first pivot and a second pivot;
    a finger extendable in a direction extending between the first pivot and the second pivot, wherein the grasper is configured to extend along a curved path; and
    a support base, wherein at least a first link of the first pantograph cell is slidably coupled with the support base for extending the grasper.

8. The grasper as recited in claim 7, wherein the finger is biased in a direction away from an object to be grasped by the grasper.

9. The grasper as recited in claim 8, wherein the finger is spring-biased by a tension spring.

10. The grasper as recited in claim 7, wherein the finger is biased in a direction toward an object to be grasped by the grasper when the grasper is extended.

11. The grasper as recited in claim 10, wherein the finger is spring-biased by a compression spring.

12. The grasper as recited in claim 10, further comprising a stop connected to the biased finger for being biased toward the object to be grasped by the grasper when the grasper is extended.

13. A grasper comprising:
    a first pantograph cell;
    a second pantograph cell coupled with the first pantograph cell at a first pivot and a second pivot; and
    a finger extendable in a direction extending between the first pivot and the second pivot, the finger biased in a direction away from an object to be grasped by the grasper, and the finger biased in a direction toward an object to be grasped by the grasper when the grasper is extended.

14. The grasper as recited in claim 13, further comprising a support base, wherein at least a first link of the first pantograph cell is slidably coupled with the support base for extending the grasper.

15. The grasper as recited in claim 13, wherein the grasper is configured to extend along a curved path.

16. The grasper as recited in claim 13, wherein the finger is spring-biased away from the object by a tension spring.

17. The grasper as recited in claim 13, wherein the finger is spring-biased toward the object when the grasper is extended by a compression spring.

18. The grasper as recited in claim 13, further comprising a stop connected to the biased finger for being biased toward the object to be grasped by the grasper when the grasper is extended.

* * * * *